United States Patent [19]
DeRees

[11] Patent Number: 5,632,673
[45] Date of Patent: May 27, 1997

[54] VENTILATION SYSTEM FOR LIGHTWEIGHT AUTOMOBILE

[75] Inventor: Delbert D. DeRees, Romeo, Mich.

[73] Assignee: Chrysler Corporation, Auburn Hills, Mich.

[21] Appl. No.: 550,263

[22] Filed: Oct. 30, 1995

[51] Int. Cl.$^6$ .................................................. B60H 1/28
[52] U.S. Cl. ........................... 454/121; 296/208; 454/146; 454/148; 454/159
[58] Field of Search ........................... 454/121, 146, 454/147, 148, 159, 161; 237/12.3 A, 12.3 C; 296/208

[56] References Cited

U.S. PATENT DOCUMENTS

| | | | |
|---|---|---|---|
| 2,175,280 | 10/1939 | Paton | 454/121 X |
| 2,687,326 | 8/1954 | Vahey | 296/208 X |
| 3,118,362 | 1/1964 | Suisse | 454/147 |
| 3,309,020 | 3/1967 | Cobley | 454/148 X |
| 3,359,881 | 12/1967 | Lamb | 454/121 |
| 4,385,549 | 5/1983 | Bauer et al. | 296/208 X |
| 4,391,465 | 7/1983 | Piano | 296/208 |
| 5,354,114 | 10/1994 | Kelman et al. | 296/208 X |

FOREIGN PATENT DOCUMENTS

| | | | |
|---|---|---|---|
| 1071000 | 8/1994 | France | 454/159 |
| 975 044 | 7/1961 | Germany | 454/121 |

*Primary Examiner*—Harold Joyce
*Attorney, Agent, or Firm*—Margaret A. Dobrowitsky

[57] ABSTRACT

A ventilation system for a lightweight automobile having a plastic body includes a heating air inlet in fluid communication with fresh air at the engine hood upper cowl of the automobile. The air inlet is rigid plastic and is bonded to the hood to stiffen the hood. The fresh air is directed through the inlet to a heat exchanger shroud within the engine compartment, and the engine exhaust pipe passes through the shroud to heat the air in the shroud. From the shroud, the heated fresh air passes through a bulkhead valve into the passenger compartment, where it can be directed toward the passengers' feet or against the windshield to defrost the windshield. In addition, a rigid plastic fresh air plenum is transversely mounted in the passenger compartment as an instrument panel, and the fresh air plenum stiffens the body. Fresh air from the cowl is directed into the plenum and out of selectively coverable openings in the plenum to cool the passenger compartment.

19 Claims, 2 Drawing Sheets

VENTILATION SYSTEM FOR LIGHTWEIGHT AUTOMOBILE

RELATED APPLICATIONS

This patent application is related to commonly-assigned U.S. patent application Ser. No. 08/540,297: for an invention entitled "MOTOR VEHICLE BODY", incorporated herein by reference.

FIELD OF INVENTION

The present invention relates generally to automobiles, and more particularly to ventilation systems for lightweight automobiles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that the cost of a lightweight automobile is relatively low because, among other things, a lightweight automobile can be propelled by a relatively small, fuel-efficient motor. Additionally, certain lightweight materials happen to be inexpensive, and easy to manufacture.

As further recognized by the present invention, it is advantageous to further reduce the weight and further simplify the construction of such an automobile by providing a simple yet effective ventilation system that both directs clean exterior air into the passenger compartment, directs heated air into the passenger compartment, and stiffens the plastic body. Thereby, the ventilation system can be used to cool the passenger compartment in hot weather, heat the passenger compartment in cold weather, and provide structural support to the lightweight body.

The present invention recognizes, however, that in a lightweight, inexpensive automobile, conventional heating systems that use heat sources separate from the engine of the automobile could unduly load the engine of the automobile and complicate the design of the automobile. Further, ventilation systems that require the use of fans likewise complicate the design of the automobile. Accordingly, the present invention is directed to a simple, cost-effective, useful ventilation system which does not depend on heat sources other than the engine to heat the passenger compartment, or depend on fans to direct fresh air into the passenger compartment.

It is therefore an object of the present invention to provide a ventilation system for a lightweight automobile which directs fresh heated or unheated air into the passenger compartment. Another object of the present invention is to provide a ventilation system for a lightweight automobile which does not require ventilation power sources other than the engine of the automobile. Yet another object of the present invention is to provide a ventilation system for a lightweight automobile which is easy to use and cost-effective to manufacture.

SUMMARY OF THE INVENTION

A ventilation system for an automobile establishes a means to direct fresh air and heated air into the passenger compartment of the automobile, as well as establishing a structural stiffening component of the automobile.

The automobile has a passenger compartment, an engine, a hood for covering the engine, and an upper hood cowl, and the ventilation system of the present invention includes a heat exchanger shroud mounted on the automobile. Furthermore, the ventilation system includes an inlet duct which establishes a fresh air duct from the upper hood cowl to the shroud, and exhaust gases from the engine heat fresh air in the shroud. An outlet air duct is in communication with the shroud for directing air into the passenger compartment of the automobile.

Preferably, the inlet duct is rigid plastic and is bonded to the hood, such that the inlet duct supports the hood. Desirably, a blower is in communication with the inlet duct, shroud, and engine for causing fresh air to flow from the inlet duct to the shroud and engine.

In a preferred embodiment, the inlet duct includes a transversely-oriented trough, and fresh air can enter the trough via the upper cowl through left and right openings in the trough. As described in detail below, a bulkhead valve is positioned between the outlet duct and the passenger compartment. As intended herein, the valve has an overboard position, wherein air in the outlet duct is directed outside the passenger compartment, and a heating position, wherein air in the outlet duct is directed into the passenger compartment.

The automobile of the preferred embodiment includes a windshield, and the ventilation system further includes at least one inboard inlet duct which is positioned in the passenger compartment in fluid communication with the bulkhead valve. Per the principles of the preferred embodiment, the inboard inlet duct is formed with at least a lower heat opening distanced from the windshield and an upper defrost opening adjacent the windshield. A selector valve is positioned in the inboard inlet duct for movement between a heating position, wherein air in the inboard inlet duct is directed through the heat opening into the passenger compartment, and a defrost position, wherein air in the inboard inlet duct is directed through the defrost opening against the windshield in the passenger compartment.

Additionally, the ventilation system includes a rigid hollow plastic fresh air plenum that is mounted in the passenger compartment and that extends transversely across the passenger compartment. Accordingly, the fresh air plenum stiffens the automobile. The fresh air plenum has an inlet fresh air opening in fluid communication with the upper cowl and a plurality of outlet fresh air vents selectively in fluid communication with the passenger compartment.

In another aspect of the present invention, a ventilation system for an automobile having a passenger compartment, a hood for covering the engine, and an upper hood cowl includes a rigid hollow plastic fresh air plenum. The plenum is mounted in the passenger compartment and extends transversely across it. Moreover, the fresh air plenum has an inlet cooling fresh air opening in fluid communication with the upper cowl and a plurality of outlet fresh air vents selectively in fluid communication with the passenger compartment.

In yet another aspect of the present invention, in an automobile having a plastic body and including a passenger compartment, an engine, a plastic hood for covering the engine, and an upper hood cowl, a ventilation system is disclosed for directing fresh air from the upper hood cowl into the passenger compartment and for providing support to the plastic body and plastic hood.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
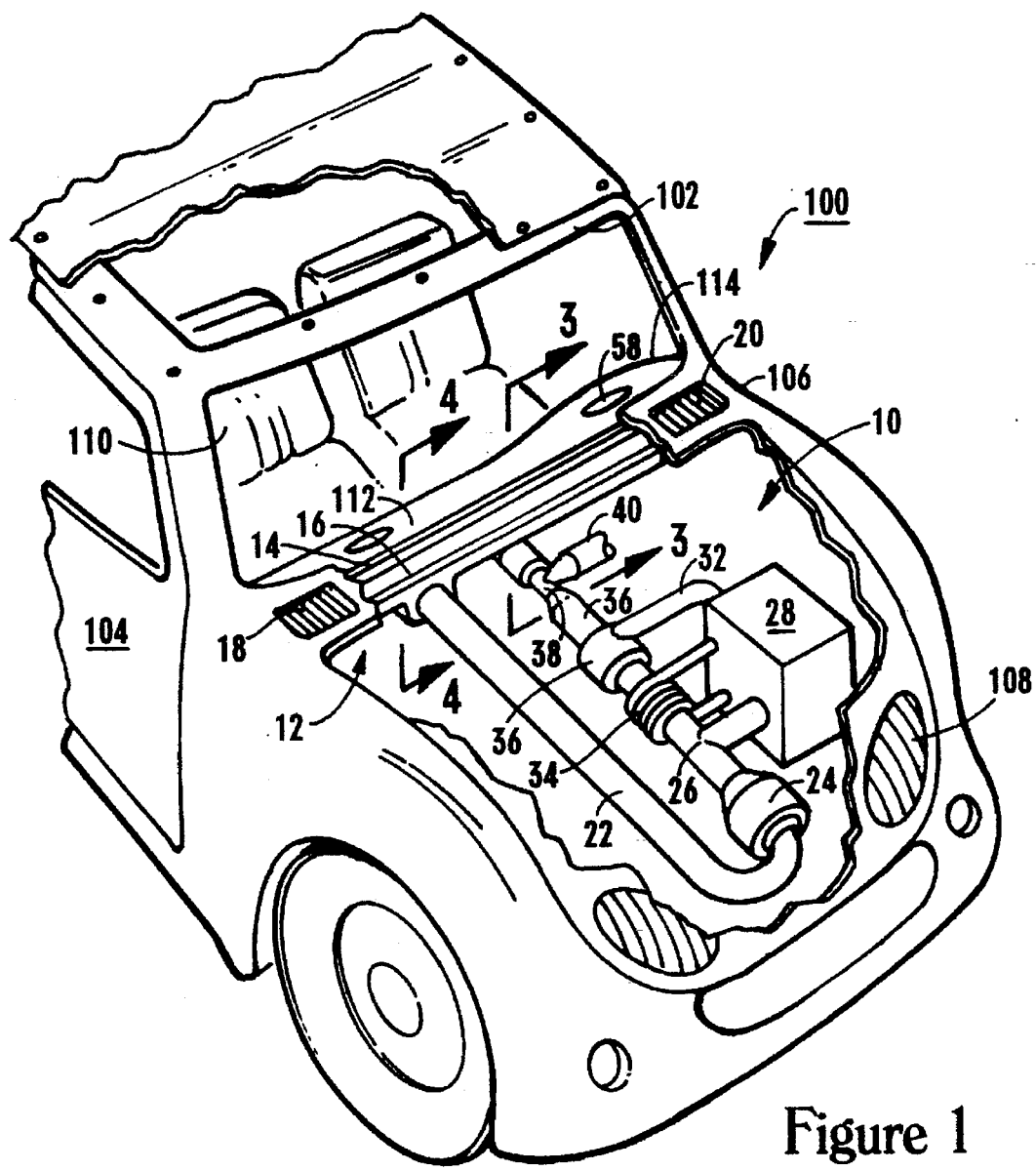
FIG. 1 is a partially schematic and partially perspective view of the automobile ventilation system of the present invention in operable association with an automobile, with portions cut away for clarity and with portions shown in phantom for clarity.

Referring initially to FIG. 1, a lightweight, injection-molded ventilation system, generally designated 10, is shown associated with an automobile, generally designated 100, having a passenger compartment 102. As intended by the present invention and described further below, the ventilation system establishes a means to direct fresh air and heated air into the passenger compartment 102, as well as establishing a structural stiffening component of the automobile 100.

In the presently preferred embodiment, the automobile 100 includes an injection-molded plastic body having opposed lightweight sides 104, 106 which establish the passenger compartment 102 therebetween. The details of the automobile 100 are disclosed in the above-referenced patent application, which is incorporated herein by reference.

As also shown in FIG. 1, the automobile 100 includes a plastic hood 108 and a windshield 110, and an upper cowl 112 is established between the hood 108 and windshield 110. Further, the automobile 100 includes an interior rigid hollow molded plastic instrument panel 114 which extends transversely across the passenger compartment 102, as more fully described below.

FIG. 1 shows that a hollow, somewhat "T"-shaped rigid molded plastic strength member 12 is formed with an upper lip 14 that is adhesively bonded to the hood 108. More particularly, the strength member 12 includes a transversely-oriented trough 16, and fresh air can enter the trough 16 via the upper cowl 112 through left and right openings 18, 20 that are formed in the trough 16. As can be appreciated in reference to FIG. 1, the fresh air flows from the openings 18, 20 through a downwardly-oriented rigid plastic duct 22 to a centrifugal air blower 24 that is mounted in the engine compartment of the automobile 100. Accordingly, it is to be understood that the strength member 12 establishes both a fresh air inlet to the engine and heating system of the present invention, as well as a structural strength member for supporting the hood 108.

The blower 24 directs the fresh air into a generally Y-shaped outlet duct 26. As shown, the outlet duct 26 in turn directs air in parallel into an engine 28 and into a hollow heat exchanger shroud 30.

Per the present invention, the exhaust of the engine 28 is directed through an exhaust pipe 32 which, as shown, passes through the hollow shroud 30. It will readily be appreciated that the hot gases in the exhaust pipe 32 radiatively heat the fresh air passing through the shroud 30, but do not commingle with fresh air in the shroud 30. Desirably, an engine oil cooling line 34 can be positioned around the outlet duct 26 to preheat the fresh air in the duct 26 and cool the oil in the oil cooling line 34.

Still referring to FIG. 1, heated fresh air exits the shroud 30 and is directed through a warm air duct 36 to a bulkhead flapper valve 38. As described further below, the bulkhead flapper valve 38 is mounted on the automobile 100 between the engine compartment and passenger compartment 102 for manipulation of the bulkhead valve 38 to selectively direct the heated fresh air overboard through an overboard pipe 40, or to direct the heated fresh air into the passenger compartment 102. With the above disclosure in mind, it can now be appreciated that by providing fresh air from the relatively elevated cowl 112, in conjunction with the heat exchange system described above, the heated air that can be directed into the passenger compartment 102 (and engine 28) is fresh and clean.

Figure 2:
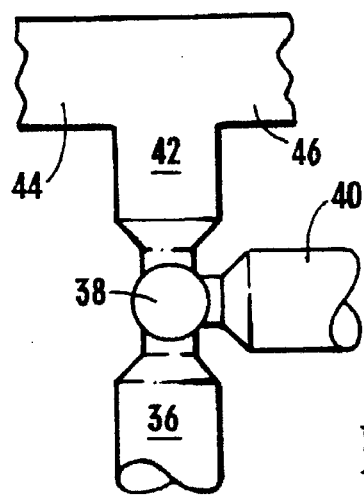
FIG. 2 is a partially schematic view of the heating duct of the ventilation system as it would appear looking forward from the passenger compartment.

Now referring to FIG. 2, a rigid hollow plastic heating inlet duct 42 is shown disposed in the passenger compartment 102 in fluid communication with the bulkhead valve 38. As shown, the inlet duct 42 branches into a left inboard inlet duct 44 and a right inboard inlet duct 46. The left inboard inlet duct 44 is described in further detail below, but it is to be understood that the right inboard inlet duct 46 is substantially identical in configuration and operation to the left inboard inlet duct 44.

Figure 3:
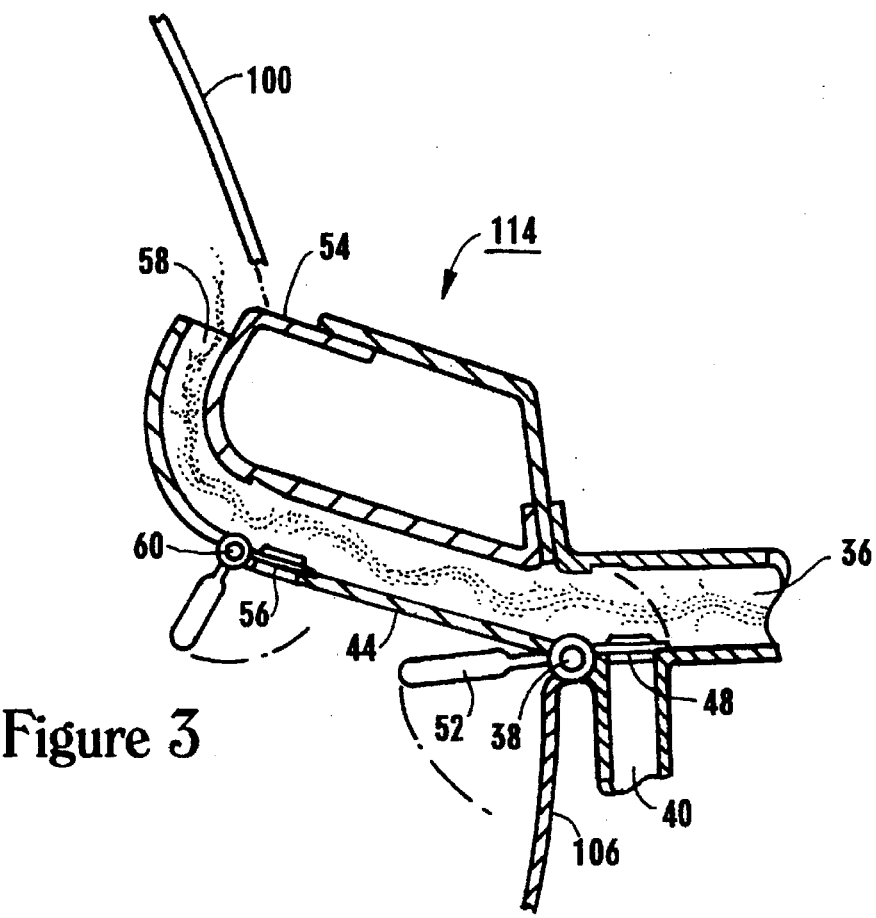
FIG. 3 is a cross-sectional view of the heating duct of the ventilation system, as seen along the line 3—3 in FIG. 1, with the bulkhead valve shown in the heating position and the selector valve shown in the defrost position, and showing in phantom the bulkhead valve in the overboard position and the selector valve in the heating position.

FIG. 3 shows the details of the left inboard inlet duct 44. As shown, the bulkhead valve 38 is a flapper valve which selectively establishes fluid communication between the warm air duct 36 and the inboard inlet duct 44. More particularly, the flapper valve 38 includes a valve disc 48 that is positioned between the warm air duct 36 and inboard inlet duct 44. Per the present invention, the valve disc 48 is pivotably mounted on the warm air duct 36 by means of a pivot mount 50. The pivot mount 50 can be any suitable pivot mount known in the art, e.g., a pin-and-bracket mount.

A bulkhead valve operator 52 is fixedly attached to or formed integrally with the valve disc 48, and the valve operator 52 is disposed in the passenger compartment 102 for manipulation by an occupant of the automobile 100. While FIG. 3 shows that the operator 52 is an elongated handle, it is to be understood that the operator 52 can include a cable (not shown) which can be conveniently positioned in the passenger compartment 102 for moving the valve disc 48, if desired.

As can be appreciated in reference to FIG. 3, the operator 52 can be manipulated to move the bulkhead valve 38 to an overboard position, wherein air in the warm air duct 36 is directed outside the passenger compartment 102 via the overboard pipe 40. Also, as shown in phantom in FIG. 3, the operator 52 can be manipulated to move the bulkhead valve 38 to a heating position, wherein air in the warm air duct 36 is directed into the passenger compartment 102 via the inboard inlet duct 44.

FIG. 3 shows that the hollow molded plastic instrument 114 shown in FIG. 1 establishes a rigid hollow plastic fresh air plenum 54. As can be appreciated in reference to FIG. 3, the plenum 54 is bonded to the sides 104, 106 of the automobile 100 and extends transversely across the passenger compartment 102. The inboard inlet ducts 44, 46 are bonded to the plenum 54. It may now be appreciated that the hollow, rigid fresh air plenum 54 with hollow, rigid ducts 44, 46 stiffens the body of the automobile 100 and provide transverse support to the body of the automobile 100.

Still referring to FIG. 3, the inboard inlet duct 44 is formed with at least one lower heat opening 56 that is distanced from the windshield 110. Moreover, the inboard inlet duct 44 is formed with at least one upper defrost opening 58 that is adjacent the windshield 110. A flapper-type selector valve 60, which in all essential respects can be identical in configuration and operation to the flapper-type bulkhead valve 38, is positioned in the inboard inlet duct 44.

As intended by the present invention, the selector valve 60 can be moved to a heating position (shown in phantom in FIG. 3), wherein air in the inboard inlet duct 44 is directed through the heat opening 56 into the passenger compartment 102. Additionally, the selector valve 60 can be moved to a defrost position (shown in solid lines in FIG. 3), wherein air in the inboard inlet duct 44 is directed through the defrost opening 58 against the windshield 110, in the passenger compartment 102.

Figure 4:
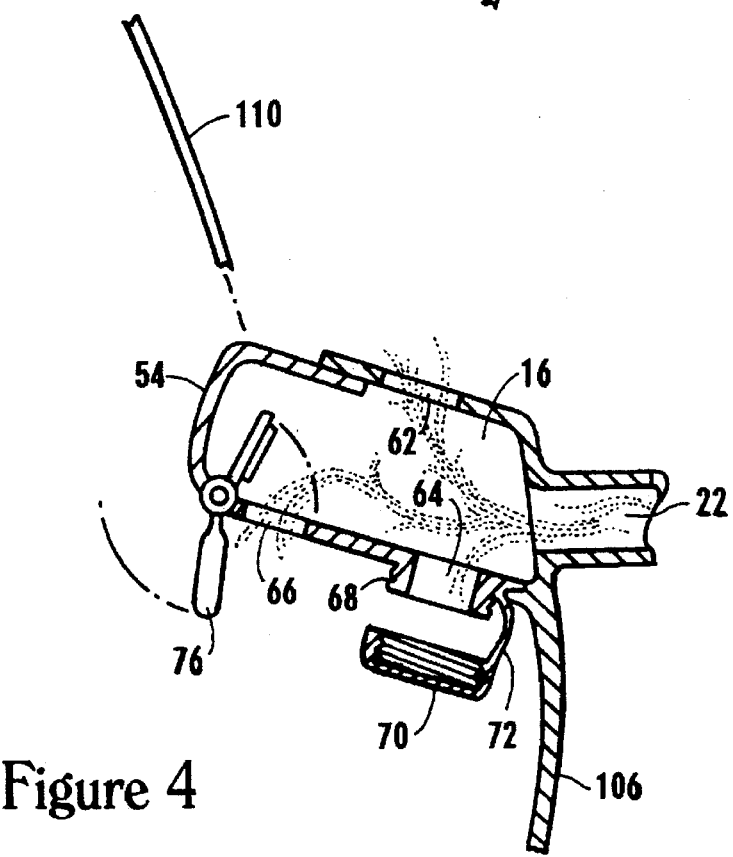
FIG. 4 is a cross-sectional view of the fresh air plenum of the ventilation system, as seen along the line 4—4 in FIG. 1, with the cover of one of the vent ports shown in an exploded relationship with the port.

Now referring to FIG. 4, the fresh air plenum 54 includes an inlet fresh air opening 62 that is in fluid communication with the upper cowl 112. Also, the fresh air plenum 54 includes a plurality of outlet fresh air vents 64, 66, each of which is selectively in fluid communication with the passenger compartment 102.

More particularly, the fresh air vent 64 is a lower fresh air vent as shown, and the lower fresh air vent 64 is bonded to or formed integrally with a hollow externally threaded fitting 68. An internally threaded cover 70 can be engaged with the fitting 68 to cover the vent 64. If desired, a cord 72 can connect the fitting 68 and cover 70 to retain the cover 70 when it is disengaged from the fitting 68.

Additionally, the fresh air vent 66 is an upper fresh air vent as shown. A flapper-type vent valve 74, which in all essential respects can be identical in configuration and operation to the flapper-type bulkhead valve 38, is positioned in the plenum 54 for selectively blocking the upper vent 66. If desired, additional vents (not shown) can be formed in the plenum 54 near the front doors of the automobile 100 and other locations from which it is desirable or appropriate to vent unheated fresh air into the passenger compartment 102.

While the particular VENTILATION SYSTEM FOR LIGHTWEIGHT AUTOMOBILE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A ventilation system for an automobile having a passenger compartment, an engine, a hood for covering the engine, and an upper hood cowl, comprising:

a heat exchanger shroud mounted on the automobile;

a rigid plastic inlet duct establishing a fresh air duct from the upper hood cowl to the shroud, the duct being bonded to the hood; and an outlet air duct in communication with the shroud.

2. The system of claim 1, further comprising a blower in communication with the inlet duct and shroud for causing fresh air to flow from the inlet duct to the shroud.

3. The system of claim 2, wherein the inlet duct includes a transversely-oriented trough, and fresh air can enter the trough via the upper cowl through left and right openings in the trough.

4. The system of claim 3, further comprising a valve positioned between the outlet duct and the passenger compartment, the valve having an overboard position and a heating position.

5. The system of claim 4, wherein the automobile includes a windshield, and the system further comprises:

at least one inboard inlet duct positioned in the passenger compartment in fluid communication with the valve, the inboard inlet duct being formed with at least a lower heat opening distanced from the windshield and an upper defrost opening adjacent the windshield; and a selector valve positioned in the inboard inlet duct, the selector valve having a heating position, wherein air in the inboard inlet duct is directed through the heat opening into the passenger compartment, and a defrost position, wherein air in the inboard inlet duct is directed through the defrost opening against the windshield in the passenger compartment.

6. The system of claim 5, further comprising a rigid hollow plastic fresh air plenum mounted in the passenger compartment and extending transversely thereacross, the fresh air plenum having an inlet fresh air opening in fluid communication with the upper cowl and a plurality of outlet fresh air vents selectively in fluid communication with the passenger compartment.

7. A ventilation system for an automobile having a passenger compartment, a hood for covering the engine, and an upper hood cowl, comprising:

a rigid hollow plastic fresh air plenum mounted in the passenger compartment and extending transversely thereacross, the fresh air plenum having an inlet cooling fresh air opening in fluid communication with the upper cowl and a plurality of outlet fresh air vents selectively in fluid communication with the passenger compartment; and a rigid plastic inlet duct bonded to the hood.

8. The system of claim 7, wherein the automobile includes an engine, and the system further comprises:

a heat exchanger shroud mounted on the automobile, the inlet duct establishing a fresh air duct from the upper hood cowl to the shroud; and an outlet air duct in communication with the shroud.

9. The system of claim 8, wherein the inlet duct supports the hood.

10. The system of claim 9, further comprising a blower in communication with the inlet duct, shroud, for causing fresh air to flow from the inlet duct to the shroud.

11. The system of claim 10, wherein the inlet duct includes a transversely-oriented trough, and fresh air can enter the trough via the upper cowl through left and right openings in the trough.

12. The system of claim 11, further comprising a valve positioned between the outlet duct and the passenger compartment, the valve having an overboard position and a heating position.

13. The system of claim 12, wherein the automobile includes a windshield, and the system further comprises:

at least one inboard inlet duct positioned in the passenger compartment in fluid communication with the valve, the inboard inlet duct being formed with at least a lower heat opening distanced from the windshield and an upper defrost opening adjacent the windshield; and a selector valve positioned in the inboard inlet duct, the selector valve having a heating position and a defrost position.

14. In an automobile having a plastic body and including a passenger compartment, an engine, a plastic hood for covering the engine, and an upper hood cowl, a ventilation system for directing fresh air from the upper hood cowl into the passenger compartment, a portion of the ventilation system being bonded to the hood for providing support to the hood.

15. The system of claim 14, further comprising:

a heat exchanger shroud mounted on the automobile;

an inlet duct establishing a fresh air duct from the upper hood cowl to the shroud;

an outlet air duct in communication with the shroud for directing air into the passenger compartment of the automobile; and a rigid hollow plastic fresh air plenum mounted in the passenger compartment and extending transversely thereacross, the fresh air plenum having an inlet cooling fresh air opening in fluid communication with the upper cowl and a plurality of outlet fresh air vents selectively in fluid communication with the passenger compartment.

16. The system of claim 15, wherein the inlet duct is rigid plastic and is bonded to the hood, such that the inlet duct supports the hood.

17. The system of claim 16, further comprising a blower in communication with the inlet duct and shroud for causing fresh air to flow from the inlet duct to the shroud.

18. The system of claim 17, wherein the inlet duct includes a transversely-oriented trough, and fresh air can enter the trough via the upper cowl through left and right openings in the trough, and the system further comprises:

a valve positioned between the outlet duct and the passenger compartment, the valve having an overboard position and a heating position.

19. The system of claim 18, wherein the automobile includes a windshield, and the system further comprises:

at least one inboard inlet duct positioned in the passenger compartment in fluid communication with the valve, the inboard inlet duct being formed with at least a lower heat opening distanced from the windshield and an upper defrost opening adjacent the windshield; and a selector valve positioned in the inboard inlet duct, the selector valve having a heating position and a defrost position.

* * * * *